(No Model.)

J. F. BLIVEN.
STOVE PROTECTOR.

No. 504,319. Patented Sept. 5, 1893.

Witnesses.
Charles Hannigan.
E. B. Read.

Inventor.
John F Bliven
by Benj Arnold
Atty.

UNITED STATES PATENT OFFICE.

JOHN F. BLIVEN, OF EAST GREENWICH, RHODE ISLAND.

STOVE-PROTECTOR.

SPECIFICATION forming part of Letters Patent No. 504,319, dated September 5, 1893.

Application filed February 20, 1893. Serial No. 463,000. (No model.)

*To all whom it may concern:*

Be it known that I, JOHN F. BLIVEN, of East Greenwich, in the county of Kent and State of Rhode Island, have invented certain new and useful Improvements in Stove-Protectors; and I do hereby declare that the following is a full, clear, and exact description thereof, reference being had to the accompanying drawings, and to the letters of reference marked thereon, which form a part of this specification.

This invention relates to cooking stove furniture, and is designed to be placed over spiders, griddles and the like, used on the stove for frying or cooking meat, to protect the stove by preventing the fat from flying out onto it and making a disagreeable smoke besides defacing the top of the stove. It is fully illustrated in the accompanying drawings.

Figure 1:
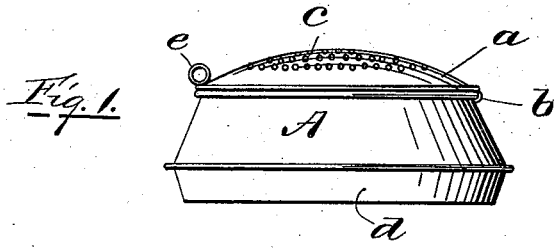
Figure 2:
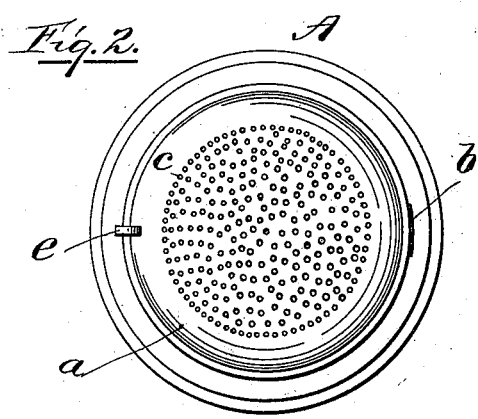
Figure 3:
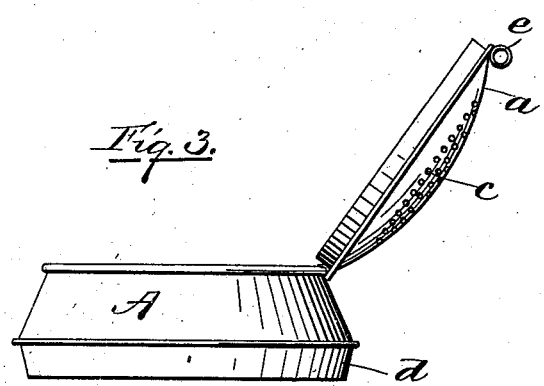
Figure 4:
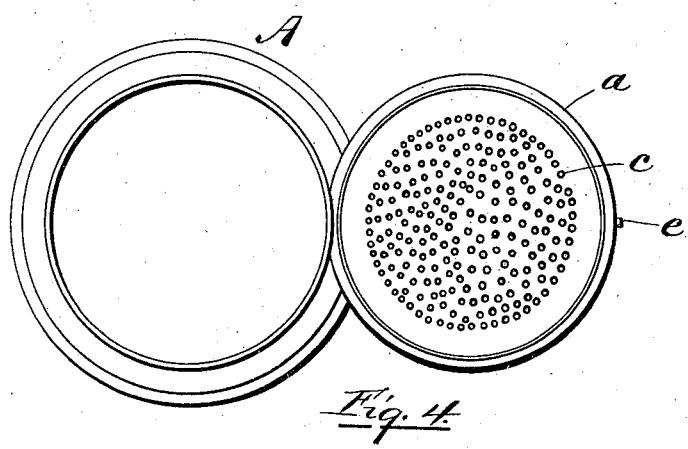

Figure 1, is a side elevation of the protector. Fig. 2, is a top view of the same, closed. Fig. 3, is a side elevation with the cover open. Fig. 4, is a top view with the cover open.

This stove protector, as it is called because it is especially intended to protect the top of the stove from the drops of fat usually thrown out of a spider when frying meat, consists of a body A, made inwardly tapering toward its top, and furnished with a rim or skirt $d$, on its lower edge also made to taper inwardly to fit the flaring top rim of a spider and form a reasonably tight joint to prevent the fat from being thrown out. A convex-shaped cover $a$, is fitted to shut into the top of the body A. This cover $a$, is hinged to one side of the body A, at $b$, and furnished with a ring or loop $e$, on the opposite side to open it by. The central part of the surface of the cover $a$, is perforated with sieve like holes $c$, or it may have a piece of wire netting let into it, so as to allow the steam that is generated in the cooking, to escape. These perforations $c$, are too small to allow of the drops of fat flying out. It is well known that it is the drops of fat thrown out of the spider, probably by the minute particles of water in combination with the fat being suddenly converted into steam, that fall on the top of the stove, which is so much hotter than the spider, that it burns them and causes the greater part of the usual disagreeable smoke of burning fat, and are also the cause of a good deal of hard labor for the neat housewife to keep the stove clean and in good order.

The cover $a$, is represented as being closed in Figs. 1 and 2, and open in Figs. 3 and 4. The object of having the movable cover, is to allow the cook to inspect the process of cooking the meat, to turn it over and take it out when done, without being obliged to take off or handle the hot utensil until it has been set aside with the spider long enough to cool down.

I am aware that covers have been made to cover dishes while cooking, as in Patent No. 242,001; but they have no perforations in the top, and are provided, instead, with pipes to connect them with the stove pipe. This latter feature is of itself very objectionable, as the frying is done on the front part of the stove, and the stove pipe being at the back, quite a length of pipe is necessary to connect the cover with the stove pipe, which would always be in the way of vessels set on the back part of the stove, and would always be a troublesome thing to manage, when off or on the stove. In view of this, I base my claim on the improved construction as an act of simplification, a most important point in useful invention.

I claim as my invention—

As a new article of manufacture, a stove protector consisting of an inwardly tapering main body, having a rim or skirt on its lower edge extending downward and also made inwardly tapering, and a convex cover hinged to the upper edge and having the larger part of its surface perforated with sieve like holes to allow of the passage of the steam.

JOHN F. BLIVEN.

Witnesses:
BENJ. ARNOLD,
E. B. READ.